United States Patent
Ton-That et al.

(10) Patent No.: US 7,314,902 B2
(45) Date of Patent: Jan. 1, 2008

(54) HOT-MELT ADHESIVE

(75) Inventors: Minh-Tan Ton-That, Montreal (CA); Johanne Denault, Longueuil (CA); Marie Gundjian, Laval (CA)

(73) Assignee: National Research Council of Canada, Ottawa, Ont.

( * ) Notice: Subject to any disclaimer, the term of this patent is extended or adjusted under 35 U.S.C. 154(b) by 254 days.

(21) Appl. No.: 11/172,840

(22) Filed: Jul. 5, 2005

(65) Prior Publication Data

US 2006/0009588 A1   Jan. 12, 2006

Related U.S. Application Data

(60) Provisional application No. 60/585,096, filed on Jul. 6, 2004.

(51) Int. Cl.
*C08F 267/04* (2006.01)
*C08F 255/02* (2006.01)
*B32B 29/00* (2006.01)

(52) U.S. Cl. ............ 525/285; 525/64; 525/327.8; 525/369; 525/245; 525/249; 524/441; 524/444; 428/35.8; 428/416; 428/420

(58) Field of Classification Search ........ 525/285, 525/64, 327.8, 369, 245, 249; 524/441, 444; 428/35.8, 416, 420
See application file for complete search history.

(56) References Cited

U.S. PATENT DOCUMENTS

| | | | |
|---|---|---|---|
| 3,862,265 A * | 1/1975 | Steinkamp et al. | 525/285 |
| 3,884,882 A * | 5/1975 | Caywood, Jr. | 525/205 |
| 3,987,122 A | 10/1976 | Bartz et al. | |
| 4,460,632 A | 7/1984 | Adur et al. | |
| 4,587,289 A | 5/1986 | Comert et al. | |
| 4,957,968 A | 9/1990 | Adur et al. | |
| 5,080,746 A | 1/1992 | Sorg | |
| 5,766,750 A | 6/1998 | Korleski | |
| 5,976,652 A * | 11/1999 | Krause et al. | 428/35.9 |
| 6,586,532 B1 * | 7/2003 | Gauthy | 525/285 |
| 6,846,870 B2 * | 1/2005 | Brima et al. | 524/437 |

FOREIGN PATENT DOCUMENTS

| | | |
|---|---|---|
| JP | 58052340 | 3/1983 |
| JP | 63111049 A * | 5/1988 |
| JP | 6136330 | 5/1994 |

* cited by examiner

*Primary Examiner*—James J. Seidleck
*Assistant Examiner*—Olga Asinovsky
(74) *Attorney, Agent, or Firm*—Hans Kornig

(57) ABSTRACT

The present invention provides a hot-melt adhesive composition comprising a blend of: a reactive filler comprising an aluminum compound, a magnesium compound, a calcium compound, a barium compound or a mixture thereof; and, a grafted polyolefin having a functional group for reaction with the reactive filler. Such a hot-melt adhesive is particularly useful for bonding a polyolefin-based substrate to dissimilar materials such as metals, wood, ceramics and thermoset plastics.

20 Claims, 1 Drawing Sheet

HOT-MELT ADHESIVE

CROSS-REFERENCE APPLICATIONS

This application claims the benefit of U.S. provisional patent application U.S. Ser. No. 60/585,096 filed Jul. 6, 2004, the entire contents of which are hereby incorporated by reference.

FIELD OF THE INVENTION

The present invention relates to adhesives, particularly to hot-melt adhesives, more particularly to hot-melt adhesives for bonding polyolefin-based substrates to dissimilar materials.

BACKGROUND OF THE INVENTION

The hydrophobicity and inert characteristics of polyolefin (PO) surfaces cause many problems in the assembly of PO-based substrates with dissimilar materials, especially polar materials. Hot-melt adhesives are often used because such adhesives are able to penetrate into the PO surface to create a good fusion bond with the PO matrix. Grafted PO (g-PO), the most popular coupling agent for PO composites and their blends, has been used in the formulation of hot-melt adhesives for joining PO-based substrates with dissimilar materials since grafted-PO contains polar groups that benefit adhesion with polar materials. To promote the fusion bonding process, hot-gun, hotplate, ultrasonic, vibration, and resistance welding may be applied.

For PO composites, especially in structural applications, adhesion at a structural joint must be strong enough to carry a load transferred into/through the joint. Current commercial hot-melt adhesives cannot sustain high load levels. Furthermore, the composition of conventional hot-melt adhesives is controlled to impart low melting point for easy operation, high flowability for good wetting with the substrates, and high tackicity for promoting adhesion. Therefore, adhesive formulas for conventional hot-melt adhesives generally comprise a large portion of low molecular weight polymer with/without functional groups and/or a polar wax. Thus, the joint is very sensitive to temperature, moisture, and other environmental effects, especially in long-term service.

Japanese Patent Abstract 58052340 published Mar. 28, 1983 describes an adhesive polyolefin resin composition comprising a graft-modified olefin polymer, an unmodified olefin polymer and 0.1-10 parts by weight magnesium oxide.

For polyolefin-based composite structures, the required bond strength is often much greater than with conventional plastics since composite structures are often used in high performance applications. Thus, there remains a need for an effective hot-melt adhesive that provides good bond strength under a variety of environmental conditions, especially for bonds between a polyolefin-based substrate and materials dissimilar to the polyolefin-based substrate.

SUMMARY OF THE INVENTION

There is provided a hot-melt adhesive composition comprising a blend of: a reactive filler comprising an aluminum compound, a magnesium compound, a calcium compound, a barium compound or a mixture thereof; and, a grafted polyolefin having a functional group for reaction with the reactive filler.

There is further provided a method of preparing a hot-melt adhesive composition comprising blending: a reactive filler comprising an aluminum compound, a magnesium compound, a calcium compound, a barium compound or a mixture thereof with a grafted polyolefin having a functional group for reaction with the reactive filler; and, reacting the reactive filler with the functional group of the grafted polyolefin.

There is yet further provided a method of bonding comprising applying, with heat, to a first substrate, a hot-melt adhesive composition as described above, and, applying, with heat, a second substrate to the hot-melt adhesive.

DETAILED DESCRIPTION

As used in the specification and the appended claims, the singular forms "a," "an" and "the" include plural referents unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Components of the Hot-melt Adhesive:

The reactive filler component of the hot-melt adhesive of the present invention comprises an aluminum compound, a magnesium compound, a calcium compound, a barium compound or a mixture thereof. Preferred are these compounds that react with acidic functional groups, for example carboxylic acid groups, carboxylic acid anhydride groups, hydroxyl groups, acidic amine groups, sulfonic acid groups, phosphonic acid groups, etc. The reactive filler may be, for example, in the form of oxides, hydroxides, silicates, etc., or a mixture thereof. Some exemplary compounds include, for example, aluminum oxide ($Al_2O_3$), aluminum hydroxide ($Al(OH)_3$), magnesium oxide (MgO), magnesium hydroxide ($Mg(OH)_2$), calcium oxide (CaO), calcium hydroxide ($Ca(OH)_2$), barium oxide (BaO), barium hydroxide ($Ba(OH)_2$), aluminometasilicates, fluoroaluminosilicates and mixtures thereof. Aluminum compounds are particularly preferred, especially aluminum compounds that react with acidic functional groups. Aluminum oxide, aluminum hydroxide, aluminum silicate, aluminum metasilicate and mixtures thereof are of particular note.

The reactive filler may be present in the hot-melt adhesive composition in any suitable amount. Of particular note is an amount of about 15% to about 80% by weight, or, of about 20% to about 60% by weight, or, of about 30% to about 55% by weight, based on the weight of the hot-melt adhesive composition. Use of reactive filler in the amounts noted above helps to bring characteristics of the adhesive composition closer to those of the substrates in terms of thermal expansion, deformation, stiffness, etc. The amounts noted above also lead to less shrinkage due to consolidation thus reducing internal stress in the adhesive, to less stress concentration in a joint formed with the adhesive, to better fatigue resistance in the joint, and to decreased sensitivity of the adhesive composition to moisture.

The grafted polyolefin component of the hot-melt adhesive of the present invention comprises a grafted polyolefin or mixture of grafted polyolefins having a functional group or groups grafted thereto for reaction with the reactive filler. The grafted polyolefin may be, for example, a polyolefin which has grafted thereto a coupling agent comprising a functional group capable of reacting with the reactive filler.

Grafted polyolefin may be present in the composition in any suitable amount. Of particular note is an amount of about 20% to about 85% by weight, or, of about 40% to about 85% by weight, or, of about 45% to about 80% by weight, based on the weight of the hot-melt adhesive composition.

In general, a grafted polyolefin with a suitable functional group may be prepared by grafting a coupling agent having the desired functional group on to a polyolefin in a grafting process. Grafting is often accomplished by using a free radical initiator or some form of activating energy (e.g., actinic radiation, heat, etc.). Free radical initiators are well known and one skilled in the art can readily select an appropriate initiator for the particular grafting reaction desired. Dialkyl peroxides, such as 1,1-bis(t-butylperoxy)-3,3,5-trimethyl cyclohexane or 2,5-dimethyl-2,5-(di-ter-butylperoxy)-hexane are examples of one class of suitable free radical initiators. Free radical initiators are preferably used in an amount of from about 0.1 to about 3.0 parts by weight, more preferably from about 0.5 to about 2.0 parts by weight, based on 100 parts by weight of the polyolefin.

The grafting process is usually performed at a suitable temperature above the melt temperature of the polyolefin (e.g. about 150-300° C., particularly about 180-220° C.) for a sufficient reaction time (e.g. about 10-180 minutes, particularly about 30-60 minutes). The grafting process is typically performed in a mixer, such as, for example, in an extruder, an internal mixer or a sigma blade mixer. The amount of coupling agent used in the grafting process is preferably from about 0.1 to about 10 parts by weight, more preferably from about 0.3 to about 5 parts by weight, for 100 parts by weight of the grafted polyolefin.

Generally, during a grafting process, the free radical initiator may be mixed with a polyolefin before the addition of coupling agent, mixed with coupling agent before combining with a polyolefin, or mixed with a melt of polyolefin and coupling agent. Contacting the components of the graft reaction is preferably done for a time period sufficient to graft from about 10 percent to about 90 percent of the coupling agent to the polyolefin. In an extruder, for example, a residence time of about 5 to about 30 seconds is generally sufficient for the grafting of the coupling agent onto the polyolefin, but this greatly depends on the amount and type of free radical initiator present.

Any functional group capable of reacting with the reactive filler is useful as part of the grafted polyolefin. Of particular note are acidic functional groups such as, for example, carboxylic acid groups, carboxylic acid anhydride groups, hydroxyl groups, acidic amine groups, sulfonic acid groups, phosphonic acid groups, etc. Functional groups of particular note are carboxylic acid and carboxylic anhydride groups. Carboxylic acid and/or carboxylic acid anhydride functional groups may be introduced on to a polyolefin by grafting unsaturated carboxylic acids, unsaturated anhydrides or a mixture thereof to the polyolefin. Some suitable unsaturated carboxylic acids include, for example, acrylic acid, maleic acid, tetrahydrophthalic acid, fumaric acid, itaconic acid, nadic acid, and methylnadic acid. Some suitable anhydrides include, for example, maleic anhydride, tetrahydrophthalic anhydride, fumaric anhydride, itaconic anhydride, nadic anhydride, and methylnadic anhydride. Maleic anhydride and acrylic acid are of particular note, especially maleic anhydride.

Any polyolefin may be suitable in the grafted polyolefins of the present invention. For example, homopolymers, copolymers or terpolymers. Some suitable specific polyolefins include, for example, polypropylene, polybutylene, polymethylpentene, polyethylenes (e.g., LDPE, HDPE, LLDPE, UHMWPE, XLPE, copolymers of ethylene with another monomer (e.g., ethylene-propylene copolymer)), etc., and mixtures thereof. Polypropylene is of particular note.

There are a number of commercially available compounds in which an unsaturated carboxylic acid or unsaturated anhydride has already been grafted on to a polyolefin. For example, maleic anhydride grafted polyolefins like Epolene™ E-43, G-3015, G-3003, C-16, C-18, G-XX01, G-XX15 from Eastman, and Polybond™ 3002, 3009, 3150, 3200 from Cromptom Corp.; and, acrylic acid grafted polyolefins like Polybond™ 1001, 1009 from Cromptom Corp.

The hot-melt adhesive composition may further comprise a polyolefin or mixture of polyolefins. The polyolefin or mixture of polyolefins is not grafted and may be used in place of some of the grafted polyolefin in order to reduce cost of the adhesive composition, and also to improve other properties such as toughness and ductility. If too much grafted polyolefin is replaced by ungrafted polyolefin, bond strength may be compromised. One skilled in the art can readily determine by simple experiment the optimal balance between bond strength and cost for any given adhesive system. Typically, up to about 40% by weight of the grafted polyolefin can be replaced by ungrafted polyolefin without unduly compromising bond strength. Of particular note, from about 1% to about 30% by weight, or, from about 1% to about 20% by weight, or, from about 1% to about 10% by weight of the grafted polyolefin may be replaced by ungrafted polyolefin. Any ungrafted polyolefin may be used to replace grafted polyolefin in the composition. A list of exemplary polyolefins is listed above in respect of the grafted polyolefins. However, when an ungrafted polyolefin is also present, it is often desirable for the ungrafted polyolefin to be the same or similar polyolefin as the one used in the grafted polyolefin in order to improve compatibility between the components of the hot-melt adhesive.

Small amounts of other additives may be present in the hot-melt adhesive composition. For example, the composition may further comprise an antioxidant, a non-reactive filler, a tackifier, a pigment, a stabilizer, a flame retardant, a microbicide, a toughener, an impact modifier, a lubricant, etc. Any suitable amount of other additives may be used. For example, up to about 5% by weight based on the weight of the composition may be used.

Preparation of the Hot-Melt Adhesive:

The hot-melt adhesive of the present invention may be prepared by blending reactive filler with grafted polyolefin in a standard blending apparatus. Blending may be performed at an elevated temperature, for example in a range from the softening temperature to the decomposition temperature of grafted polyolefin. For example, the temperature may be from about 160° C. to about 240° C., or from about 170° C. to about 220° C., or from about 180° C. to about 200° C. Mixing time depends on the particular ingredients and the temperature used, but it typically may vary from about 30 seconds to about 10 minutes. For example, melt blending of grafted polyolefin with additives may be used in the practice of this invention. Typically, in a melt blending operation, grafted polyolefin (together with ungrafted polyolefin if desired) is heated to a temperature sufficient to form a melt followed by addition of the desired amount of reactive filler (and other additives if desired). The melt blend may then be subjected to shear and/or extensional mixing by mechanical means in a suitable mixer, such as an extruder, an internal mixer, an extensional flow mixer, a kinetic mixer, or a continuous mixer. For example, grafted polyolefin (together with ungrafted polyolefin if desired) may be charged to a pre-heated Brabender™ mixer followed by addition of reactive filler (and other additives if desired) whereupon the mixture is homogenized. Films of the adhesive composition so prepared may be formed by blow molding, by compression molding or by calendaring. Alternatively, a melt of grafted polyolefin or blend of grafted and ungrafted polyolefin may be introduced at one end of an extruder (single or twin-screw) and reactive filler (and other additives if desired) added to the melt all at once or in stages along the extruder. Homogenized adhesive composition is received at the other end of the extruder.

During the blending process, the reactive filler reacts with the functional group of the grafted polyolefin. Thus, the resulting hot-melt adhesive composition comprises the reaction product of the reactive filler with the grafted polyolefin. While it is generally desirable for the reaction to be substantially complete, the hot-melt adhesive composition may also comprise unreacted grafted polyolefin and/or unreacted reactive filler.

Methods of Bonding Using the Hot-Melt Adhesive:

The hot-melt adhesive composition of the present invention may be used to bond together any substrates, but it is particularly useful for bonding a polyolefin-based substrate to a substrate based on a material dissimilar to the polyolefin-based substrate, for example, to metal (e.g. common steel, stainless steel, aluminum, brass, etc.), wood, ceramic, thermoset plastic, etc. Polyolefin based substrates comprise a polyolefin, such as for example, polypropylene, polybutylene, polymethylpentene, polyethylenes (e.g., LDPE, HDPE, LLDPE, UHMWPE, XLPE, copolymers of ethylene with another monomer (e.g., ethylene-propylene copolymer)), etc, or mixtures thereof. Polyolefin substrates may further comprise a reinforcing material, for example, fibers, nanotubes, whiskers, etc., or mixtures thereof made from glass, carbon, polyester or any other suitable material or mixtures thereof. Reinforced polyolefin substrates may be called polyolefin composites. Polypropylene and polypropylene composites (e.g. glass fiber reinforced polypropylene) are of particular note.

The hot-melt adhesive composition may be applied to the surface of a substrate by any suitable means, for example, hot-gun techniques, hotplate techniques, hot-press techniques, ultrasonic welding, vibration welding, resistance welding, microwave welding, gravimetric pressure techniques with or without temperature control, etc.

Proper preparation of the substrates can enhance bond strength. For example, substrate surfaces may be cleaned to remove dirt, grease and the like and roughened to increase the exposed surface area for bonding. Solvents may be used to clean metal surfaces and metal substrates may be sand blasted to both clean and roughen the surface. Polyolefin-based substrates can be prepared without the inclusion of release agents to prevent surface contamination.

In a bonding process, temperature may affect the strength of the resulting bond. It is advantageous to apply the hot-melt adhesive composition to the polyolefin-based substrate at a temperature above the melt temperature of the substrate. For polyolefin-based substrates, the strength of the bond at the adhesive/substrate interface is greatly affected by the ability of the adhesive to diffuse into the substrate. By applying the adhesive to the polyolefin-based substrate at a temperature above the melt temperature of the substrate, the surface of the substrate will partially melt permitting efficient diffusion of the adhesive into the substrate resulting in a stronger bond. The heat supplied is advantageously well controlled so that only a thin layer of the polyolefin-based substrate is melted to reduce degradation of the substrate. For polypropylene-based adhesives, temperatures in excess of about 170° C. are very suitable, in particular from about 170° C. to about 220° C. Adhesion of the adhesive to a metal substrate is primarily governed by electrostatic interactions while adhesion to wood or ceramic substrates may be controlled by both electrostatic interactions and diffusion.

In a bonding process, joining pressure and adhesive thickness may also affect the strength of the resulting bond. Joining pressure and adhesive thickness (thickness of the joint) are related since the application of larger pressure results in a thinner adhesive layer between two substrates. Conversely, less pressure is needed when starting with a thinner film of adhesive. Generally, the application of higher pressure leads to an increase in bind strength as the thickness of the adhesive layer is reduced. Without being held to any particular theory of action, it is thought that a decrease in the thickness of the join permits a quick transfer of a load through the joint meaning that there is less stress concentration in the joint. However, increasing the pressure too much during a bonding process may lead to structural failure of a substrate, and, attaining very high pressures may be impractical. In addition, there is a limit as to how thin the adhesive layer may be since a layer which is too thin will not permit good contact between the surfaces of the substrates leading to a reduction in bond strength. A joint thickness of from about 0.02 mm to about 1 mm, particularly about 0.05 mm, with a pressure of greater than about 6 MPa typically provides good results.

In a bonding process, joining time may also affect the strength of the resulting bond. Any suitable length of time may be used and the optimum time generally depends on the other parameters previously discussed. In an optimum process, the joining conditions may be a temperature of from about 170° C. to about 200° C., for a time of about 1-3 minutes, at a pressure greater than about 6 MPa with a thickness of about 0.05 mm.

When a polyolefin composite having fibrous reinforcement is used as one of the substrates, fibre orientation at the surface of the composite can also play a role in bond strength. Better bond strength is generally obtained when the direction of the applying force on the joint is parallel to the direction of orientation of the fibres.

In comparison to current commercial hot-melt adhesives, hot-melt adhesives of the present invention have improved long-term characteristics, including good resistance to cyclic loading and humidity, and good temperature resistance particularly up to about 50° C.

BRIEF DESCRIPTION OF THE DRAWINGS

In order that the invention may be more clearly understood, preferred embodiments thereof will now be described in detail by way of example, with reference to the accompanying drawings, in which.

EXAMPLES

Figure 1:
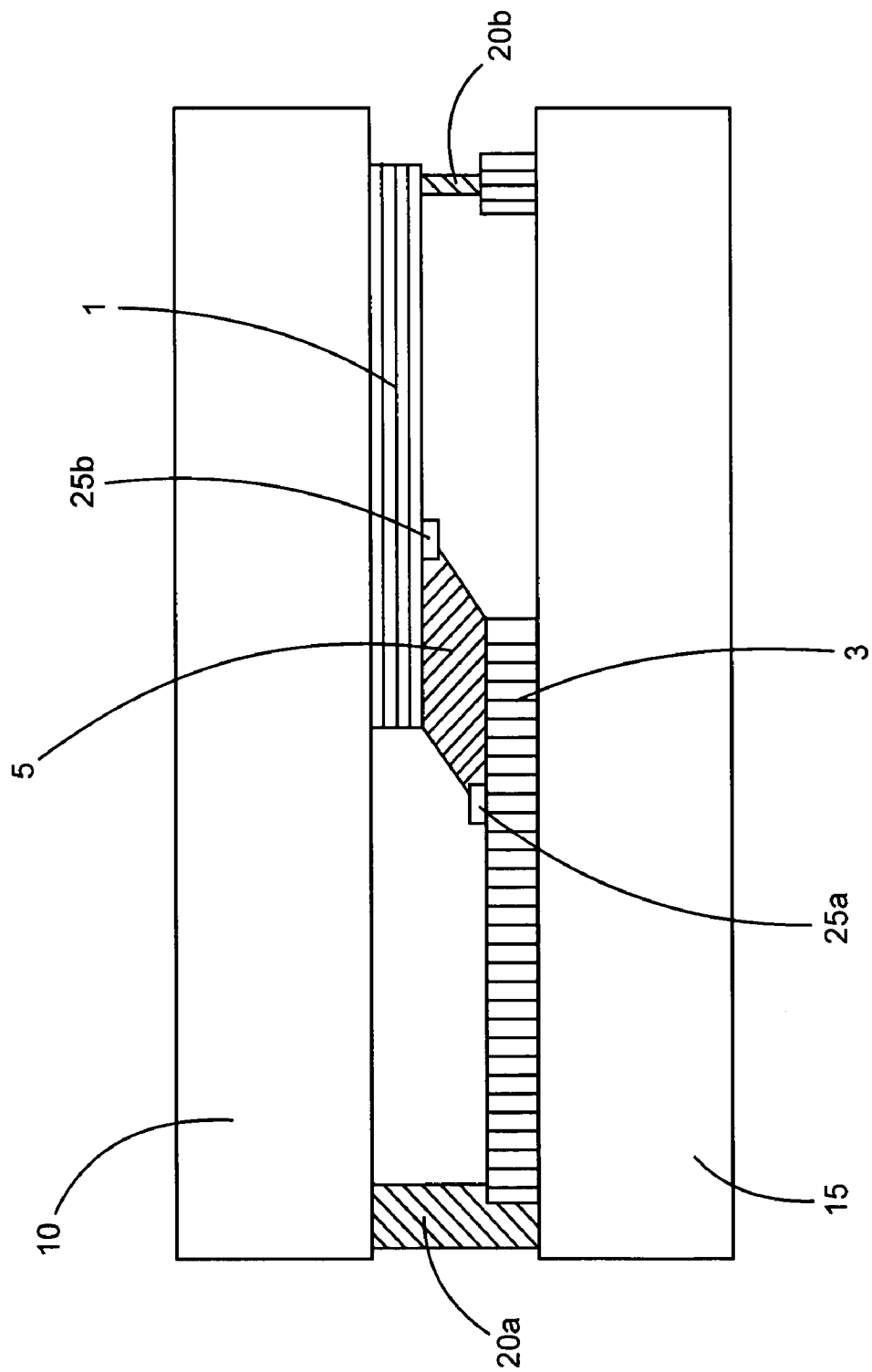
FIG. 1 is a schematic diagram of an apparatus used to join two substrates in a single overlap shear joining process.

Abbreviations and Definitions:
PP=polypropylene
MA=maleic anhydride
AA=acrylic acid
MAgPP=maleic anhydride graft polypropylene
MgPP=acrylic acid graft polypropylene GF=glass fibre
PP/GF=polypropylene/glass fibre composite
Materials and Methods:

Polypropylene (PP) 6100 SM was obtained commercially from Montell.

Maleic anhydride graft polypropylene (MAgPP) (Polybond™ 3150) and acrylic acid graft polypropylene (AAgPP) (Polybond™ 1001) were obtained commercially from Crompton Corp.

Aluminum oxide (0.4-0.5 micron) was obtained from Malakoff Industries Inc.

Aluminum silicate ASP NC was obtained from Engelhard.

Antioxidant Igranox™ MD1024 was obtained from Ciba-Geigy.

PP/GF composite was Twintex™ obtained from Vetrotex.

Example 1

Preparation of Hot-Melt Adhesive Compositions

Grafted polyolefin (MAgPP or MgPP) and antioxidant (Igranox™ MD1024)), together with PP and other polymer based additives if desired, are charged to a pre-heated Brabender™ mixer at 200° C. to be fully melted. Reactive filler, and other additives if desired, is then added and the mixture homogenized for 5-10 minutes to form the hot-melt adhesive composition. Films (100 micron thickness) of the resultant hot-melt adhesive composition are prepared by compression molding at 180° C. on a Wabash™ machine.

Example 2

Single Overlap Shear Joining

In subsequent examples, single overlap shear bonding was used for joining two substrates with a hot-melt adhesive of the present invention. Referring to FIG. 1, a single overlap shear joining process is depicted in which a first substrate (1), for example PP/GF composite, is joined to a second substrate (3), for example common steel, by a hot-melt adhesive (5). Joining temperature is controlled by an upper hot-plate (10) and a lower hot-plate (15) such that the temperature of the hot-melt adhesive (5) is above the adhesive's melt temperature. Pressure may be applied by an external means (not shown), for example by a weight, a press or any other suitable means. During joining at high temperatures, the adhesive (5) melts and flows, which may cause the substrates (1, 3) to move thereby resulting in poor alignment of the substrates. To mitigate against this problem, strips of thermally stable plastic tape (25a, 25b) wrapped around the substrates (1, 3) prevent movement along the substrate surfaces and provides a well-defined demarcation between joined and unjoined regions of the substrates. In addition, elastomer supports (20a, 20b) may be used to prevent motion in other directions.

Example 3

MAgPP Adhesive—Effect of Type and Amount of Reactive Filler

Various hot-melt adhesive compositions based on a maleic anhydride graft polypropylene (MAgPP) (Polybond™ 3150) were formulated generally following the procedure outlined in Example 1. Each of the adhesives so prepared were used to bond a polypropylene/glass fibre (PP/GF) composite (Twintex™) substrate to a common steel substrate using the bonding procedure described in Example 2. The lap shear strength of each bond was measured using a 5500R Instron™ machine according to ASTM D3164-97. The various hot-melt adhesive compositions and the resulting lap shear strengths of the bonds formed by each adhesive are listed in Table 1.

TABLE 1

| Reactive Filler | Amount of Reactive Filler (wt. %) | Lap Shear Strength (MPa) |
| --- | --- | --- |
| None | 0 | 11.443 |
| $Al_2O_3$ | 9 | 12.125 |
| $Al_2O_3$ | 19 | 12.959 |
| $Al_2O_3$ | 29 | 12.899 |
| $Al_2O_3$ | 39 | 15.443 |
| $Al_2O_3$ | 49 | 17.659 |
| $Al_2O_3$ | 54 | 18.044 |
| $Al_2O_3$ | 59 | 17.816 |
| $Al_2O_3$ | 69 | 15.782 |
| aluminum metasilicate | 9 | 11.316 |
| aluminum metasilicate | 19 | 12.75 |
| aluminum metasilicate | 24 | 14.753 |
| aluminum metasilicate | 29 | 14.686 |
| aluminum metasilicate | 34 | 14.601 |
| aluminum metasilicate | 39 | 14.11 |

Example 4

MAgPP Adhesive—Effect of Matrix Composition

Various hot-melt adhesives compositions comprising MAgPP were formulated generally following the procedure of Example 1 except that some of the MAg-PP was replaced by ungrafted-PP (PP 6100). These compositions comprised 54% by weight $Al_2O_3$ and 1% antioxidant (Igranox™ 1024D), based on the weight of the adhesive composition. Each of the adhesives so prepared were used to bond a polypropylene/glass fibre (PP/GF) composite (Twintex™) substrate to a common steel substrate using the bonding procedure described in Example 2. Table 2 provides the lap shear strength for a join using each of the adhesives. The PP concentration is expressed as the percentage amount of PP in the polymer matrix component of the adhesive.

TABLE 2

| PP concentration (%) | Lap Shear Strength (MPa) |
| --- | --- |
| 0 | 18.044 |
| 20 | 18.742 |
| 30 | 19.518 |
| 40 | 17.228 |
| 60 | 11.557 |
| 80 | 7.464 |
| 100 | 6.032 |

An optimized composition of the present invention comprises 31.5 wt % MAgPP, 13.5 t % PP, 54 wt % $Al_2O_3$ and 1% antioxidant, based on the weight of the composition, giving a lap shear strength of 19.5 MPa. Such an adhesive can be used as a structural adhesive. This composition is referred to as IMI in Example 5 below.

Example 5

AAgPP Adhesive—Effect of Type and Amount of Reactive Filler

Various hot-melt adhesive compositions based on an acrylic acid graft polypropylene (AAgPP) (Polybond™

1001) were formulated following the procedure outlined in Example 1. Each of the adhesives so prepared were used to bond a polypropylene/glass fibre (PP/GF) composite (Twintex™) substrate to a common steel substrate using the bonding procedure described in Example 2. The lap shear strength of each bond was measured as described in Example 3. The various hot-melt adhesive compositions and the resulting lap shear strengths of the bonds formed by each adhesive are listed in Table 3.

TABLE 3

| Reactive Filler | Amount of Reactive Filler (wt. %) | Lap Shear Strength (MPa) |
| --- | --- | --- |
| None | 0 | 15.903 |
| Al$_2$O$_3$ | 9 | 15.626 |
| Al$_2$O$_3$ | 14 | 13.768 |
| Al$_2$O$_3$ | 24 | 11.576 |
| aluminum silicate | 20 | 17.125 |
| aluminum silicate | 40 | 15.661 |
| aluminum silicate | 60 | 10.433 |

Example 6

MgPP Adhesive—Effect of Matrix Composition

Various hot-melt adhesives compositions comprising AAgPP were formulated following the procedure of Example 1 except that some of the Mg-PP was replaced by ungrafted-PP (PP 6100). These compositions comprised 20% by weight aluminum metasilicate and 1% antioxidant (Igranox™ 1024D), based on the weight of the adhesive composition. Each of the adhesives so prepared were used to bond a polypropylene/glass fibre (PP/GF) composite (Twintex™) substrate to a common steel substrate using the bonding procedure described in Example 2. The lap shear strength of each bond was measured as described in Example 3. Table 4 provides the lap shear strength for a joint using each of the adhesives. The PP concentration is expressed as the percentage amount of PP in the polymer matrix component of the adhesive.

TABLE 4

| PP concentration (%) | Lap Shear Strength (MPa) |
| --- | --- |
| 0 | 15.903 |
| 19.8 | 15.004 |
| 39.6 | 13.805 |
| 59.4 | 11.57 |
| 80 | 8.548 |
| 99 | 5.84 |

Example 7

MAgPP Adhesive—Comparison to Commercial Adhesives

The bond strengths of some standard commercial adhesives were compared to the bond strength of an adhesive of the present invention. Table 5 depicts the results.

TABLE 5

| Adhesive System | Substrates | Lap Shear Strength (MPa) |
| --- | --- | --- |
| IMI | PP/GF composite to steel | 19.5 |
| HB5006 | Flame treated PP/GF composite to steel | 14.1 |
| HB5006 | PP/GF composite to steel | 4.2 |
| Sika | Flame treated PP/GF composite to steel | 5.6 |
| Sika | PP/GF composite to steel | 0.6 |
| Loctite-605FL | Flame treated and primed PP/GF composite to steel | 5.0 |
| Loctite-605FL | PP/GF composite to steel | 3.7 |
| Sika Ultrat | Thermoset/GF composite to steel | 5.1 |
| 3-M 5298 | Thermoset/GF composite to steel | 3.2 |
| 3-M CA9 | Thermoset/GF composite to steel | 17 |

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A method of bonding comprising:
    (a) applying with heat to a first substrate, a hot-melt adhesive composition comprising a blend of
        (i) aluminum oxide, aluminum hydroxide, aluminum metasilicate, aluminum silicate or a mixture thereof in an amount of from 15 to 80 wt % based on weight of the composition, and
        (ii) a maleic anhydride graft polyolefin; and,
    (b) applying, with heat, a second substrate to the hot-melt adhesive composition.

2. The method according to claim 1, wherein the first substrate comprises a polyolefin and the second substrate comprises a material dissimilar to the polyolefin of the first substrate.

3. The method according to claim 1, wherein the first substrate comprises a composite of a polyolefin and fibrous reinforcement.

4. The method according to claim 2, wherein the first substrate comprises a composite of polypropylene and fibrous reinforcement.

5. The method according to claim 2, wherein the second substrate comprises a metal.

6. The method according to claim 1, wherein the hot-melt adhesive composition comprises aluminum oxide.

7. The method according to claim 1, wherein the hot-melt adhesive composition comprises aluminum metasilicate.

8. The method according to claim 1, wherein the amount is 20-60 wt %.

9. The method according to claim 1, wherein the maleic anhydride graft polyolefin is present in the hot-melt adhesive composition in an amount of from 40 to 85 wt % based on weight of the composition.

10. The method according to claim 1, wherein the maleic anhydride graft polyolefin comprises maleic anhydride graft polypropylene.

11. The method according to claim 1, wherein the composition further comprises an ungrafted polyolefin or mixture of ungrafted polyolefins.

12. A method of bonding comprising applying, with heat, a hot-melt adhesive composition to a first and second substrate, the hot-melt adhesive composition comprising a blend of aluminum oxide, aluminum metasilicate or a mixture thereof in an amount of from 15 to 80 wt % based on weight of the composition; and, a maleic anhydride graft polyolefin.

13. The method according to claim 12, wherein the first substrate comprises a polyolefin and the second substrate comprises a material dissimilar to the polyolefin of the first substrate.

14. The method according to claim 13, wherein the first substrate comprises a composite of a polyolefin and fibrous reinforcement.

15. The method according to claim 13, wherein the first substrate comprises a composite of polypropylene and fibrous reinforcement.

16. The method according to claim 13, wherein the second substrate comprises a metal.

17. The method according to claim 12, wherein the amount of aluminum oxide, aluminum metasilicate or a mixture thereof is 20-60 wt %.

18. The method according to claim 12, wherein the malelic anhydride graft polyolefin is present in the hot-melt adhesive composition in an amount of from 40 to 85 wt % based on weight of the composition.

19. The method according to claim 17, wherein the maleic anhydride graft polyolefin comprises maleic anhydride graft polypropylene which is present in the composition in an amount of 40 to 85 wt % based on weight of the composition.

20. The method according to claim 12, wherein the composition further comprises an ungrafted polyolefin or mixture of ungrafted polyolefins.

* * * * *